Oct. 6, 1931.  E. A. STEPHENS  1,826,098

TOOL ATTACHMENT MEANS

Filed Aug. 8, 1930

Inventor;
Edward A. Stephens,
per Arthur J. Farnsworth.
Attorney.

Patented Oct. 6, 1931

1,826,098

UNITED STATES PATENT OFFICE

EDWARD A. STEPHENS, OF LOS ANGELES, CALIFORNIA

TOOL ATTACHMENT MEANS

Application filed August 8, 1930. Serial No. 473,921.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means of attaching auxiliary devices to other implements as, for example, means for attaching special weed-hoes, devil-grass cutters, and like devices, to ordinary garden implements such as hoes and rakes. Its principal objects include; first, to provide improved attachment means that are applicable to a large variety and sizes of implements that commonly are employed for garden purposes, whereby these may be combined with other selected tools; and, second, to supply a very simple and inexpensive device for this purpose.

These objects are attained in the manner illustrated in the accompanying drawings, wherein—

Similar reference numerals refer to similar parts throughout the several views.

Figure 1:
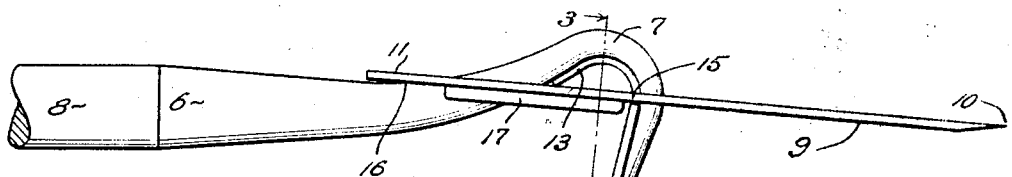
Figure 1 is a side elevation of a common garden hoe, with a special weed-cutter attached thereto by means that utilize the principles of my invention.
Figure 3:
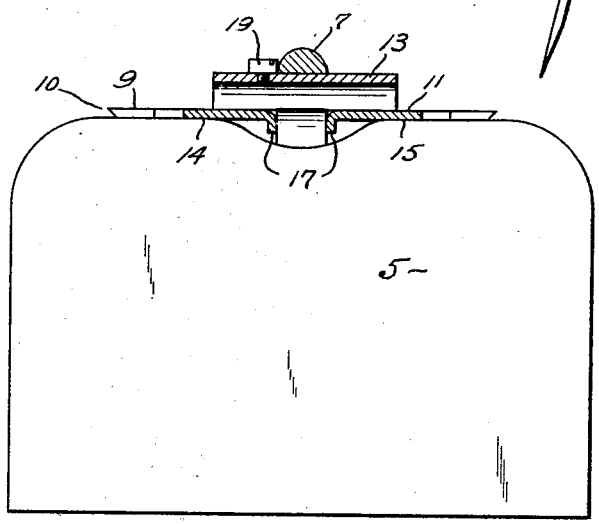
Figure 3 is a front elevation of the above combination tool, in which certain parts are shown in section, as taken on the line 3—3 of Fig. 1.
Figure 2:
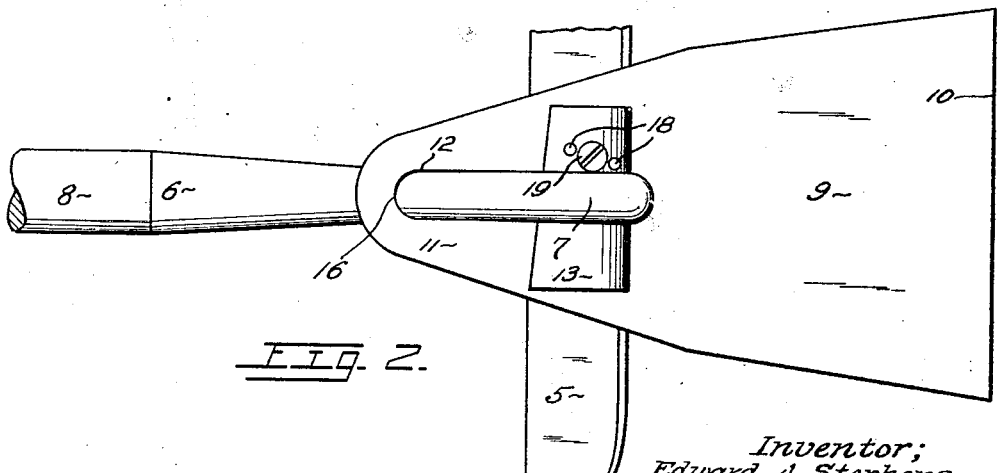
Figure 2 is a plan view of the above construction.

Although I have selected a common garden hoe and a special weed-cutter for the purpose of illustrating my improved attachment means, it will be obvious that my invention is applicable to a large variety of tools and auxiliary devices. The invention is not limited to tools and devices of any specific character, but concerns itself with a means whereby many kinds of tools may be assembled in pairs, to constitute a composite tool.

Ordinary garden implements are usually mounted upon their handles by means of a metallic socket, at the extremity of a crooked or looped member that engages and extends from the body of the tool. The common garden hoe illustrated has such features. The blade of this hoe is shown at 5, and this is attached to a metallic socket 6 by means of the looped shank 7. The working handle 8 is fitted into socket 6, and extends therefrom. The special weed-cutter illustrated comprises a flat blade 9, sharpened to a cutting edge at 10. It is used for such purposes as shearing off weeds under low wide branches of trees, and when in use, the composite tool is turned upside down from the position illustrated. The weed-cutter tapers backwardly from its cutting edge, and has a triangular rear portion 11 with a slot 12 along its center line near its apex.

The dimensions of this slot are such as to allow shank 7 to pass snugly therethrough, and to permit the loop of the shank to extend above the top of the blade. A suitably shaped tapered wedge 13 is then forced tightly into the loop above the blade, to complete the attachment.

It will be noted that this attachment provides a widely spaced three-point bearing for blade portion 11, maintained by the force of the reaction exerted by loop 7, the latter force being directed within the area of the triangle defined by the three-point bearing. Thus blade portion 11, rests upon the two highest underlying portions of the edge of hoe-blade 5, as at 14 and 15, and upon the top of the rear end of the hoe shank at 16. All lateral movement of blade 9 is prevented by reason of the fact that slot 12 fits shank 7 snugly, and because the shank is forced into the slot as far as it will go, by means of wedge 13. All necessary latitude of adjustment is provided by the wedge, which is suitably shaped for that purpose.

Obviously the attachment described is very rigid and stable, and it is admirably adapted to withstand the stresses to which it may be subjected in use.

I prefer to make slot 12 by a punching operation, in which a pair of integral flanges 17 are turned downwardly from the material of blade portion 11. The purpose of these flanges is two-fold. They afford an additional bearing area against the sides of shank 7, and they serve to prevent downward deflection of blade portion 11, such as might otherwise be caused by the action of wedge 13.

The wedge may be solid, but I prefer to fashion it in the form of a tapered trough, of resilient metal, of the shape of a shoe-horn, as illustrated. Such a wedge, when forced home, will change its shape sufficiently to closely conform to the contour of loop 7, and thus secure a resilient bearing of greater area than a solid wedge would ordinarily afford.

To prevent the wedge from working loose in service, a series of angularly aligned tapped holes 18 may be provided, and into the appropriate one of these holes a fillister headed screw 19 may be inserted. The only duty this screw has to perform is to prevent the wedge from backing out, and it need not be large or strong.

It will be noted that a great variety of auxiliary devices may be most satisfactorily attached to other implements in the manner described. Such auxiliary devices may, for example, be devil-grass cutters, special cultivators, spades, rakes, etc.; and they may in turn be attached to such implements as garden hose, rakes, cultivators, and many others. A large variety of combination tools may be assembled in this way, and new combinations may be made at any time very quickly. All that is required is an implement that is provided with a looped shank 7, and an upper edge upon which the auxiliary devices may be supported; auxiliary devices having suitably positioned flat plate portions 11, with slots therein through which the looped shank may be passed snugly; and a wedge adapted for being inserted through the loop of the shank, to press the plate portion against said upper edge and the top of the straight portion of the shank.

Having thus fully described my invention, I claim:

1. In combination with a tool having a looped shank extending therefrom; an auxiliary device having a slotted plate portion through which the loop of the shank is passed; and a wedge inserted through said loop, bearing against the plate and forcing it against other portions of the tool.

2. In combination with a tool having a looped shank extending therefrom; an auxiliary device having a plate portion extending therefrom, with a slot therein through which the loop of the shank is passed and which it snugly fits; and a wedge inserted through said loop, bearing against said plate and forcing it against the shank adjacent its loop, and against other portions of the tool that are spaced from the shank.

3. In combination with a tool affording bearing portions for attachments, and having a looped shank extending transversely from the line of said portions and therebetween; an auxiliary device having a plate portion extending therefrom, with a slot therein through which the loop of the shank is passed and which it snugly fits; and a wedge inserted through said loop, bearing against said plate, and forcing it against the top of the shank outside of the loop, and against said bearing portions of the tool.

4. A construction as set forth in claim 1, wherein the wedge is resilient sheet metal of arcuate cross-section, adapted to adjust its conformation to the inner periphery of the loop when it is forced into position.

5. A construction as set forth in claim 1, wherein the side margins of the slot are flanged; and wherein the wedge is of resilient sheet metal of arcuate cross-section, adapted to adjust its conformation to the inner periphery of the loop when it is forced into position.

EDWARD A. STEPHENS.